(12) United States Patent
Mironică et al.

(10) Patent No.: US 11,615,507 B2
(45) Date of Patent: Mar. 28, 2023

(54) AUTOMATIC CONTENT-AWARE COLLAGE

(71) Applicant: Adobe Inc., San Jose, CA (US)

(72) Inventors: Ionuț Mironică, Bucharest (RO); Andreea Bîrhală, Bucharest (RO)

(73) Assignee: Adobe Inc., San Jose, CA (US)

( * ) Notice: Subject to any disclaimer, the term of this patent is extended or adjusted under 35 U.S.C. 154(b) by 324 days.

(21) Appl. No.: 16/862,424

(22) Filed: Apr. 29, 2020

(65) Prior Publication Data

US 2021/0342972 A1 Nov. 4, 2021

(51) Int. Cl.
*G06T 3/40* (2006.01)
*G06T 7/00* (2017.01)
*G06F 3/0482* (2013.01)
*G06F 3/0484* (2022.01)
*G06F 3/04845* (2022.01)

(52) U.S. Cl.
CPC .......... *G06T 3/4038* (2013.01); *G06F 3/0482* (2013.01); *G06F 3/04845* (2013.01); *G06T 7/0002* (2013.01); *G06T 7/97* (2017.01); *G06T 2207/20221* (2013.01)

(58) Field of Classification Search
CPC ....... G06T 3/4038; G06T 7/97; G06T 7/0002; G06T 2207/20221; G06F 3/0482; G06F 3/04845
USPC ....................................................... 382/100
See application file for complete search history.

(56) References Cited

U.S. PATENT DOCUMENTS

| | | | | |
|---|---|---|---|---|
| 10,380,452 B1* | 8/2019 | Piovano | ............... | G06K 9/6267 |
| 2008/0316328 A1* | 12/2008 | Steinberg | ............. | G06V 10/242 |
| | | | | 348/222.1 |
| 2010/0322521 A1* | 12/2010 | Tal | ............... | G06T 11/60 |
| | | | | 382/199 |
| 2012/0314974 A1* | 12/2012 | Yang | ............... | G06T 7/33 |
| | | | | 382/294 |
| 2015/0098664 A1* | 4/2015 | Minamihara | ......... | G06T 3/4038 |
| | | | | 382/284 |

OTHER PUBLICATIONS

"Adobe Photoshop Express", Retrieved at: https://www.adobe.com/products/photoshop-express.html—on Feb. 12, 2020, 4 pages.
"Adobe Spark", Retrieved at: https://spark.adobe.com/—on Feb. 12, 2020, 7 pages.
Bianco,"User Preferences Modeling and Learning for Pleasing Photo Collage Generation", Jun. 1, 2015, 28 pages.
(Continued)

*Primary Examiner* — Tadesse Hailu
*Assistant Examiner* — Darrin Hope
(74) *Attorney, Agent, or Firm* — FIG. 1 Patents

(57) ABSTRACT

Techniques and systems are described for automatic content-aware collages. Collage templates are generated based on generated set of initial points. Salient regions are determined within digital images, and the salient regions are matched with cells of a collage template. Chrominance of digital images may be mediated to provide a cohesive color scheme among the digital images, and geometric parameters of digital images may be generated to optimize visible salient regions within cells of the template. A collage is generated incorporating the digital images in corresponding cells of the template.

20 Claims, 13 Drawing Sheets

(9 of 13 Drawing Sheet(s) Filed in Color)

(56) References Cited

OTHER PUBLICATIONS

Chen,"Encoder-Decoder with Atrous Separable Convolution for Semantic Image Segmentation", Aug. 22, 2018, 18 pages.

Huang,"Analysis of Hu's Moment Invariants on Image Scaling and Rotation", May 2010, 6 pages.

Kazemi,"One Millisecond Face Alignment with an Ensemble of Regression Trees", Jun. 2014, 8 pages.

Kirkpatrick,"The Ultimate Planar Convex Hull Algorithm?", Oct. 1983, 18 pages.

Koch,"Siamese Neural Networks for One-shot Image Recognition", Jan. 2015, 30 pages.

Lee,"Automatic Content-Aware Color and Tone Stylization", Retrieved from <https://arxiv.org/pdf/1511.03748.pdf>, Nov. 12, 2015, 12 pages.

Liu,"Picture Collage", Nov. 7, 2009, pp. 1225-1239.

Mills-Tetty,"The Dynamic Hungarian Algorithm for the Assignment Problem with Changing Costs", Jul. 2007, 19 pages.

Pitie,"The Linear Monge-Kantorovitch Linear Colour Mapping for Example-Based Colour Transfer", CVMP, 2007, Nov. 2007, 9 pages.

Rother,"AutoCollage", Proceedings of SIGGRAPH, Jul. 29, 2006, 6 pages.

Rother,"Digital Tapestry", IEEE Computer Vision and Pattern Recognition or CVPR, I, Jul. 2005, 8 pages.

Sandler,"MobileNetV2: Inverted Residuals and Linear Bottlenecks", Mar. 21, 2019, 14 pages.

Suzuki,"Topological Structural Analysis of Digitized Binary Images by Border Following", Dec. 1983, pp. 32-36.

Wu,"PicWall: Photo Collage On-the-fly", Oct. 2013, 10 pages.

Wu,"Very Fast Generation of Content-Preserved Photo Collage Under Canvas Size Constraint", Nov. 2014, 28 pages.

Yu,"Content-Aware Photo Collage Using Circle Packing", Feb. 2014, pp. 182-195.

* cited by examiner

AUTOMATIC CONTENT-AWARE COLLAGE

CLAIM OF PRIORITY

This application claims priority under 35 USC 119 or 365 to Romanian Application No. A/10021/2020, filed Apr. 29, 2020, the disclosure of which is incorporated in its entirety.

BACKGROUND

Collages are used to combine multiple digital images together to form a single digital image, such as through interaction with a computing device. A user, for instance, may capture a variety of digital images on a mobile device or a dedicated digital camera, and wish to combine a representative collection of these digital images into a collage. The collage acts to enable viewing of these digital images together as a single work of art.

Conventional techniques used by a computing device to create collages from digital images include techniques for manual creation of collages that are tedious and frustrating to perform by a user. For instance, a user of these conventional techniques is subjected to several steps to manually create a collage within an image editing application, such as selecting a preconfigured layout having a collection of partitions, determining which digital images are to be included in which partitions, and manually resizing, cropping, or clipping the digital images, and so forth. Even after these interactions are performed, the user may then decide that the layout as having the digital images is flawed and then choose another layout and repeat this process. Further, preconfigured layouts or collage templates typically employ simple geometric masks, such as rectangles. Accordingly, collages generated from conventional collage templates lack creativity or originality and may waste space on non-salient features of the digital images as the templates cannot adjust or adapt to particular digital images being placed within them.

To generate a creative collage that is varied, complex, and visually pleasing, a user may further utilize an image editing application to generate a collage without the use of a template. However, this process may involve, for instance, manual creation of layered content including clipping masks that define visible boundaries of image data in other layers of the layered content. Creating layered content and clipping masks are complicated manual processes requiring technical proficiency with an image editing application, and a user that is familiar with creating clipping masks may lack the artistic knowledge or experience to determine which portions of a digital image will be the most aesthetically pleasing. Additionally, a user cannot visually evaluate the aesthetic qualities of layered content until it has already been created. Thus, determining an optimal size, shape, and location for each clipping mask in layered content presents a number of challenges.

Accordingly, conventional techniques as implemented by a computing device may be frustrating to the user and computationally inefficient by requiring repeated interaction with the computing device to achieve a desired result, thereby resulting in inefficient use of computing resources and thus inefficient operation of a computing device that implements conventional collage systems.

SUMMARY

Techniques and systems are described for automatic content-aware collages. In one example, an automatic content-aware collage system is configured to generate a collage template, automatically and without user intervention, by using a set of initial points to generate cells of a template. For instance, the set of initial points may include randomly generated initial points, then the cells of the template may incorporate complex shapes. This permits the system to generate complex templates at run-time, providing different original and creative templates each time the system is utilized, which is not possible using conventional techniques for generating collage templates.

The automatic content-aware collage system uses the generated collage templates to generate collage candidates that incorporate digital images into the cells of a template. For instance, an image saliency system is utilized to determine salient regions of input digital images, and a shape matching system is employed to match the digital images with cells of a template based on the salient regions. Each digital image is matched with a corresponding cell in a template to create a collage candidate.

A collage candidate is further processed by a display optimization system, such as to mediate colors or optimize geometric parameters. A color mediation system, for instance, mediates chrominance of each respective digital image according to chrominance of a target digital image, providing a cohesive color scheme among the digital images included in the collage. A region optimization system may optimize geometric parameters of each respective digital image to maximize visible salient portions of each digital image in the respective cells of the collage. For instance, translation parameters and scale parameters are determined to size and locate salient portions of the digital images to be visible in the collage. A collage is generated that incorporates each of the digital images in corresponding cells of the template, forming a collage.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
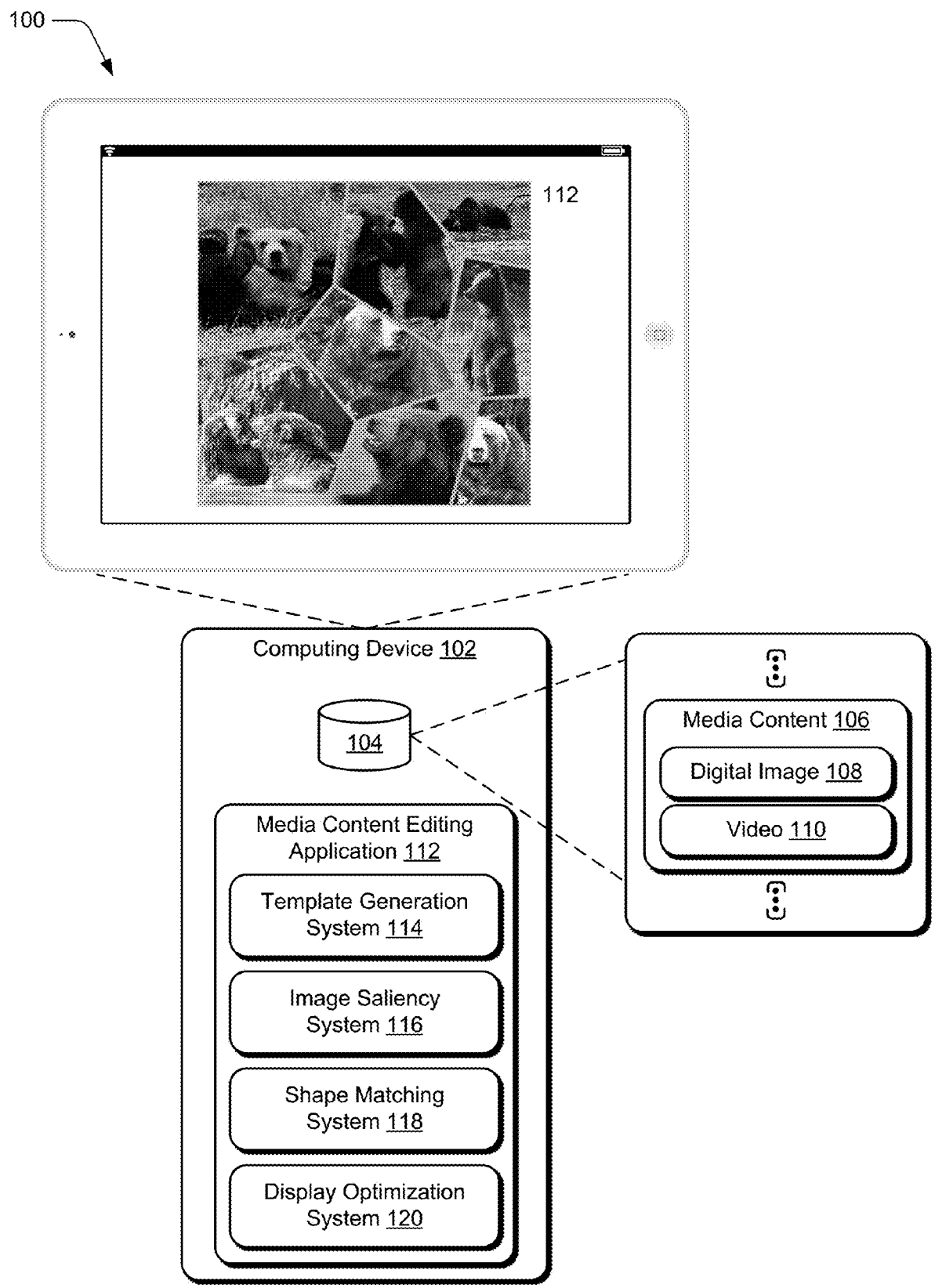
FIG. 1 is an illustration of an environment in an example implementation that is operable to employ automatic content-aware collage techniques described herein.

Collages combine multiple digital images together to form a single digital image as a collage. However, conventional techniques for creating a collage are limited to repetitive and complicated manual actions or to generic simple collages. For example, a user of conventional manual techniques is subjected to numerous steps to manually create a collage, such as selecting a preconfigured layout having a collection of partitions, determining which digital images are to be included in which partitions, manually resizing digital images to fit appropriately within the partitions, and so forth. Further, conventional preconfigured layouts or collage templates typically employ simple geometric masks, such as rectangles. Accordingly, collages generated from conventional collage templates lack creativity or originality, and require large amounts of a user's time.

Accordingly, automatic content-aware collage techniques and systems are described that overcome the challenges of conventional techniques. In one example, an automatic content-aware collage system is configured to generate a collage template responsive to a user input, automatically and without user intervention, by using generated set of initial points as a foundation to generate cells of a template. Randomly generated initial points, for instance, permits the system to generate unique and original templates each time the system is utilized, in contrast to conventional techniques utilizing predefined templates. For instance, while conventional techniques rely on a finite number of preconfigured layouts that are generated prior to operation by a consumer, the automatic content-aware collage techniques described herein may generate templates during operation by a consumer, thus allowing the same techniques to generate an infinite number of different templates. This is not possible using conventional techniques for collage templates which must store the predefined templates in storage of a computing device, thus limiting a number of predefined templates based on available device resources.

A template generation system using the techniques described herein, for example, may create templates at run time by utilizing randomly generated points as a foundation to create a Voronoi diagram (i.e., a partition of a plane into cells based on a set of initial points). The points used to create a Voronoi diagram, for instance, may be randomly generated each time a Voronoi diagram is created, allowing for an infinite number of possible templates for each of a variable number of cells and ensuring that generated collages have different and original complex structures.

The automatic content-aware collage system uses these collage templates to generate collage candidates that incorporate digital images into the cells of a template. For instance, an image saliency system may be utilized to generate a saliency map for each input digital image, describing a visual saliency of pixels in the digital image as having a distinctness that causes portions of the digital image to stand out from neighboring portions. A shape matching system may be employed to match digital images with cells of a template based on the saliency maps. For example, the shape matching system may convert the salient pixels of a saliency map into a convex shape encompassing the salient pixels as a salient region, and compare the salient region with cells of the template to identify a match that best fits the salient region within a corresponding cell. Each digital image is matched with a corresponding cell in a template to create a collage candidate.

The collage candidate may be further processed by a display optimization system, such as to mediate colors or optimize geometric parameters to maximize visibility of salient regions. A color mediation system, for instance, may mediate chrominance of each respective digital image according to chrominance of a target digital image. In implementations, the target digital image may be a representation of a combination of all of the digital images, such that every digital image is mediated toward a 'central' chrominance and minimizing the changes to individual digital images. The color mediation system may identify foreground regions and background regions of each digital image, and may mediate chrominance of the foreground and background regions separately. As an example, foreground regions of a digital image are mediated according to foreground regions of a target digital image without respect for background regions of either digital image.

Further, the display optimization system may employ a region optimization system to tune geometric parameters of respective digital images. For instance, the geometric parameters may include translation and scale, and respective translation and scale parameters may be determined for each respective digital image. The geometric parameters for a digital image may be based on the salient region of the digital image, such as to resize or reposition the digital image with respect to its corresponding cell according to the salient region (e.g., generating translation parameters to locate the center of the salient region with the center of the cell, causing the center of the digital image as a whole to be off-set from the center of the cell).

Thus, each digital image may be mapped to a respective cell of a template, may have its chrominance mediated to a target chrominance, and may have its geometric parameters optimized. A collage is then generated that incorporates each of the digital images into their corresponding cells of the template. This may include, for example, creating multiple collages corresponding to multiple respective templates, each with their own respective geometric parameters, and ranking the multiple collages or displaying the multiple collages for selection by a user. A collage is output, such as by displaying the collage on a display device, storing the collage in a memory device, communicating the collage via a network, and so forth.

As a result, users are provided with dynamic collages that are content-aware and automatically generated, and operational efficiency is improved for computing devices employing automatic content-aware collage techniques. Further, the systems and techniques described herein provide a number of improvements over conventional techniques. For instance, the automatic content-aware collage techniques described herein provide automatic collages that are original and display creativity, and can automatically position salient portions of digital images within cells of the collage despite the incorporation of complex and non-regular polygon shapes.

The described techniques thus remedy inefficiencies and resource wastage experienced in typical collage systems, while providing additional functionality not offered by typical collage systems. User device resources are conserved since a user is initially presented with relevant and creative collages. Thus, a user isn't forced to engage in a repeated manual creation process, which can unnecessarily burden device resources such as processor bandwidth and network bandwidth utilized to process and communicate information pertaining to such tasks. For example, by reducing the excessive amount of user interaction required by manual collage creation techniques, system resources such as data storage, memory, processor bandwidth, and network bandwidth used to store, process, and communicate digital images and collage templates are conserved.

Further discussion of these and other examples is included in the following sections.

Term Examples

"Media content" or an "image" refers to any electronic media content that includes a visible creation such as a design or an electronic file that embodies the visible creation. Examples of digital visual content include digital graphics, digital images, digital images that include graphics, digital videos, and so forth. Examples of digital graphics include, but are not limited to, vector graphics, raster graphics (e.g., digital photographs), layouts having different types of graphics, and so forth.

A "collage" is a compilation of multiple items of media content within a specified collage template. The items of media content may comprise images, video, text, audio, or other types of media content.

A "collage template" is a vacant layout arrangement including one or more cells that can be filled with items of media content to create a collage. A "cell" is thus a defined portion or region of a collage template.

A "Voronoi diagram" refers to a partition of a plane (for instance, a digital canvas) into cells corresponding to a set of initial points in the plane. A "cell" is a region in the plane corresponding to an initial point, and the region includes all points in the plane closer to the initial point than any other initial point.

"Saliency" refers to a quality by which an object, for example a pixel, stands out relative to its neighbors. A saliency is a distinct subjective perceptual quality that may make an object prominent, conspicuous, or striking, and grab the attention of a viewer.

A "saliency map" refers to a representation describing saliency of different parts of an image. For example, a saliency map describes a saliency of each individual pixel of an image. A saliency map may be binary (e.g., each part of the image is either salient or non-salient) or may incorporate degrees of salience (e.g., numerical values indicating an amount or amplitude of salience). A "salient region" refers to a portion of a saliency map that includes salient pixels, but may also include non-salient pixels. For example, a convex polygon may define a salient region that is a smallest convex polygon that includes all salient pixels, or all pixels with a saliency higher than a threshold value, and so forth.

A "moment feature" is a quantitative measure of the shape of a function of pixel intensities in a group of pixels of a digital image, and describes statistical characteristics of the group of pixels. A moment feature may describe a group of pixels, for instance, with a value that is rotation, translation, and/or scale invariant. In implementations, moment features are scale and translation invariant, but are rotation variant.

A "parameter" is any measurable factor usable to alter digital visual content, and may include factors for altering digital visual content by sharpening or softening, changing a color depth, changing contrast or brightness, change gamma, adjust colors, and so forth. Example parameters for adjusting color or white balance include the parameters of 'temperature' and 'tint'. Example parameters for tonal adjustments include 'exposure', 'contrast', 'highlights', 'shadows', 'whites', and 'blacks'. An example parameter for adjusting color fullness or intensities is 'saturation'. A particular item of digital visual content may be associated with particular values for various parameters. A "geometric parameter" is any measurable factor usable to alter geometric attributes of digital visual content, for example scale and position or translation.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ automatic content-aware collage techniques described herein. The illustrated environment 100 includes a computing device 102 having a processing system and one or more computer-readable storage media as further described in relation to FIG. 13. The computing device 102 includes a storage element 104, which is configured to store media content 106 such as one or more digital images 108 or one or more videos 110. The media content 106 may be captured by a camera of the computing device 102, transferred from a camera external to the computing device 102, obtained from a service provider system via a network, and so forth. The media content 106 may also include other types of media, such as animations, vector graphics, and so forth.

The computing device 102 further includes a media content editing application 112. The media content editing application 112 may be provided using any suitable combination of hardware, software, firmware, and/or logic devices. The media content editing application 112 represents functionality operable to create and/or edit media content, including automatically creating collages. Creating and editing media content may also include removing unwanted frames from video, editing digital images or video, stitching together multiple items of media content to form a single item of media content, and so on. The media content editing application 112 may comprise a part of one or more other applications, such as camera applications, social networking applications, applications for website design, or software development applications, for example. The media content editing application 112 may include a variety of component modules or systems configured to implement functionalities for automatic creation of collages as a compilation of multiple items of media content, such as a template generation system 114, an image saliency system 116, a shape matching system 118, and a display optimization system 120. In at least some implementations, the computing device 102 may include functionality to access web-based resources (e.g., content and services), browse the Internet, interact with online providers, and so forth as described in further detail below, such as through a network.

The template generation system 114 is representative of logic implemented at least partially in hardware of the computing device 102 to generate a plurality of collage templates for use in automatic creation of collages. The template generation system 114 may allow, for instance, user inputs providing specifications or details for a template to be created. The image saliency system 116 is representative of logic implemented at least partially in hardware to generate an image saliency map and/or an image gradient map for an input digital image. The image saliency system 116, for instance, may determine what portions of a digital image are distinct. The shape matching system 118 is representative of logic implemented at least partially in hardware of the computing device 102 to perform matching between regions in a template and regions in a digital image, while maximizing salient content in the visible regions of matched results. The shape matching system 118, for instance, selects portions of an input digital image to use within a shape included as part of a collage template. The display optimization system 120 is representative of logic implemented at least partially in hardware of the computing device 102 to optimize presentation of the selected portions of an input digital image within the corresponding portion of the collage template. The display optimization system 120, for instance, performs a color mediation technique, alters geometric parameters of the input digital image, and so forth.

The computing device 102, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as further described in FIG. 13.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
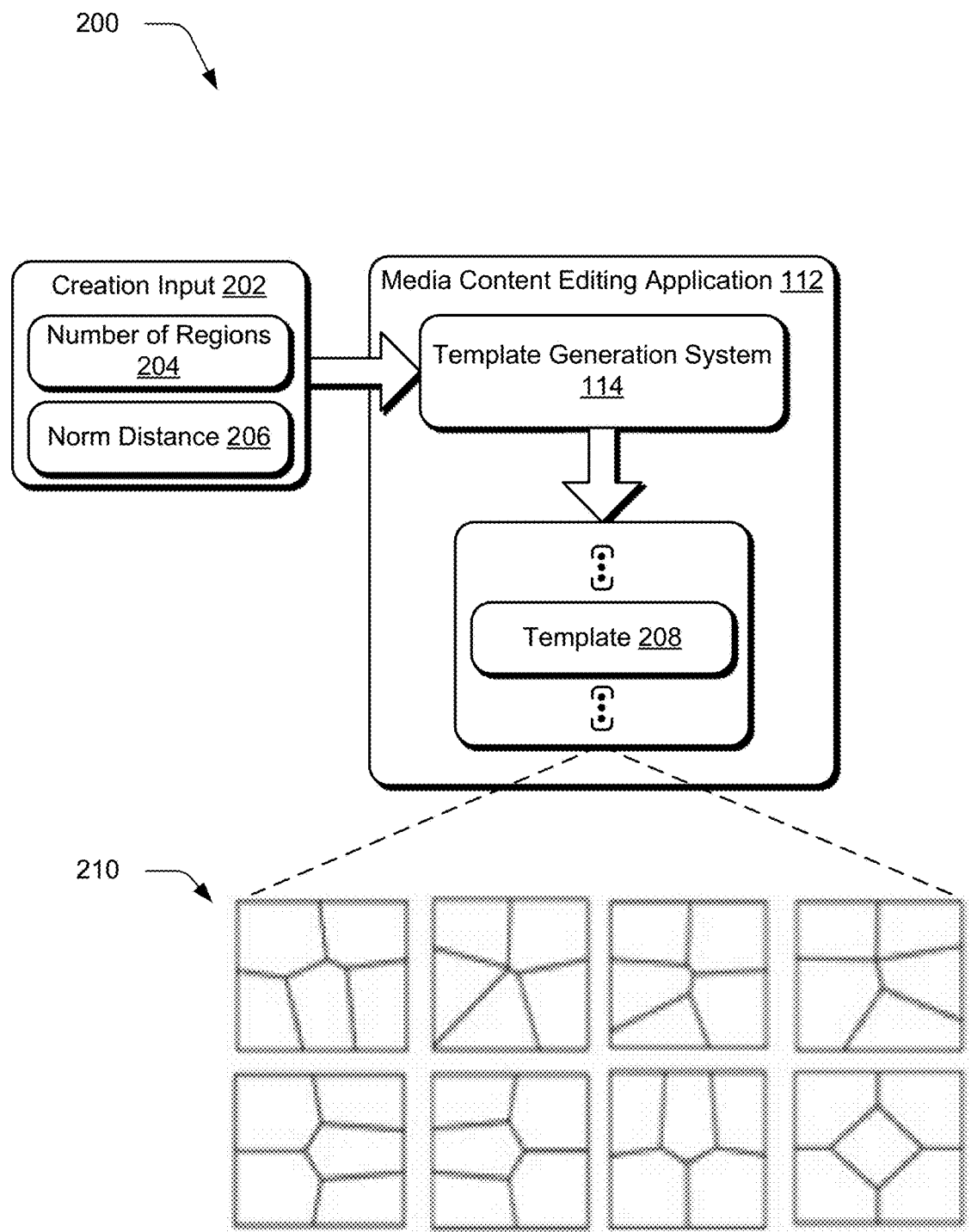
FIG. 2 depicts a system in an example implementation showing operation of an example template generation system for generating collage templates.

FIG. 2 depicts a system 200 showing an example template generation processing pipeline of the template generation system 114 of FIG. 1 in greater detail. The template generation processing pipeline begins by the template generation system 114 receiving a creation input 202. For example, the creation input 202 may be formed at least in part based on a user input, may be formed automatically, may leverage insights gleaned from machine learning techniques, and so forth. The creation input 202 includes a number of regions 204 and a norm distance 206. In order to provide creativity and increased variety in collages, the media content editing application 112 leverages the template generation system 114 to generate a new template 208, or set of templates 208, upon receiving an input to initiate creation of a collage, without requiring a user to search through pre-existing templates. For instance, a user of the media content editing application 112 may create different collages with a same number of digital images (and/or the same digital images), yet receive different templates 208 each time collage generation is performed. To do so, the template generation system 114 utilizes Voronoi or Delaunay diagrams to generate the templates 208.

A Voronoi diagram represents a way to divide a plane into a collection of regions by specifying a set of initial points or sites around which regions will be formed. For each specified point, a region is created that includes points closer to that site than to any other site. These partitions of the plane are called cells, and are convex polygons. The Voronoi diagram of a set of points is the dual graph of Delaunay triangulation, and a cell may be denoted by:

$$V(p_i) = \{q \in C | \|q - p_i\| < \|q - p\|, \forall p \in P\}$$

where C is a set of all points in the canvas where the collage is to be displayed, P is a set of initial points around which Voronoi regions will form, $V(p_i)$ is the Voronoi region of point $p_i \in P$, and $\|\cdot\|$ denotes a norm (e.g., a Euclidean norm).

Accordingly, the Voronoi diagram may be generated by first generating a Delaunay triangulation of the point set P, and the circumcenters of triangles are the vertices of the Voronoi diagram. The number of points in the point set P may be the number of regions 204 in the creation input 202. The Delaunay triangulation may be performed, for instance, using a convex hull algorithm There are infinite configurations for coordinates of the initial points P, and the initial points P may be chosen in any arbitrary manner. In some implementations, the initial points P are randomly generated. However, a set of initial points P that is randomly generated without constraints allows for very asymmetrical diagrams with cells ranging from tiny to very large, which are not aesthetically pleasing or suitable for a collage template. To overcome this obstacle, the template generation system 114 may initialize a constrained random set of the points P in a centered manner. In these implementations, the template generation system 114 samples from a uniform distribution over [0,1) and assigns initial sites to the centroids of card(P) clusters obtained from the generated samples.

In some implementations, the norm distance 206 used by the template generation system 114 is a Euclidean norm, or L2 norm, however other norms may be used. The norm distance 206, for instance, defines a function space according to a p-norm for finite-dimensional vector spaces (e.g., an LP space of Lebesgue space), and may affect the definition of a length of a vector. For example, the template generation system may generate templates 208 according to a norm distance 206 for an L1 norm distance, an L2 norm distance, an L3 norm distance, and an L4 norm distance. The templates generated according to different norm distances may be displayed to a user for selection or may be further evaluated by the media content editing application 112 for suitability (e.g., based on an amount of salient content portrayed in each template).

The template generation system 114 may generate a plurality of templates 208 corresponding to a particular creation input 202, depicted as example templates 210. The example templates 210 each correspond to a number of regions 204 of five, and a norm distance 206 of L2. However, each respective one of the example templates 210 was generated with a different set of initial points P, resulting in different templates.

Figure 3:
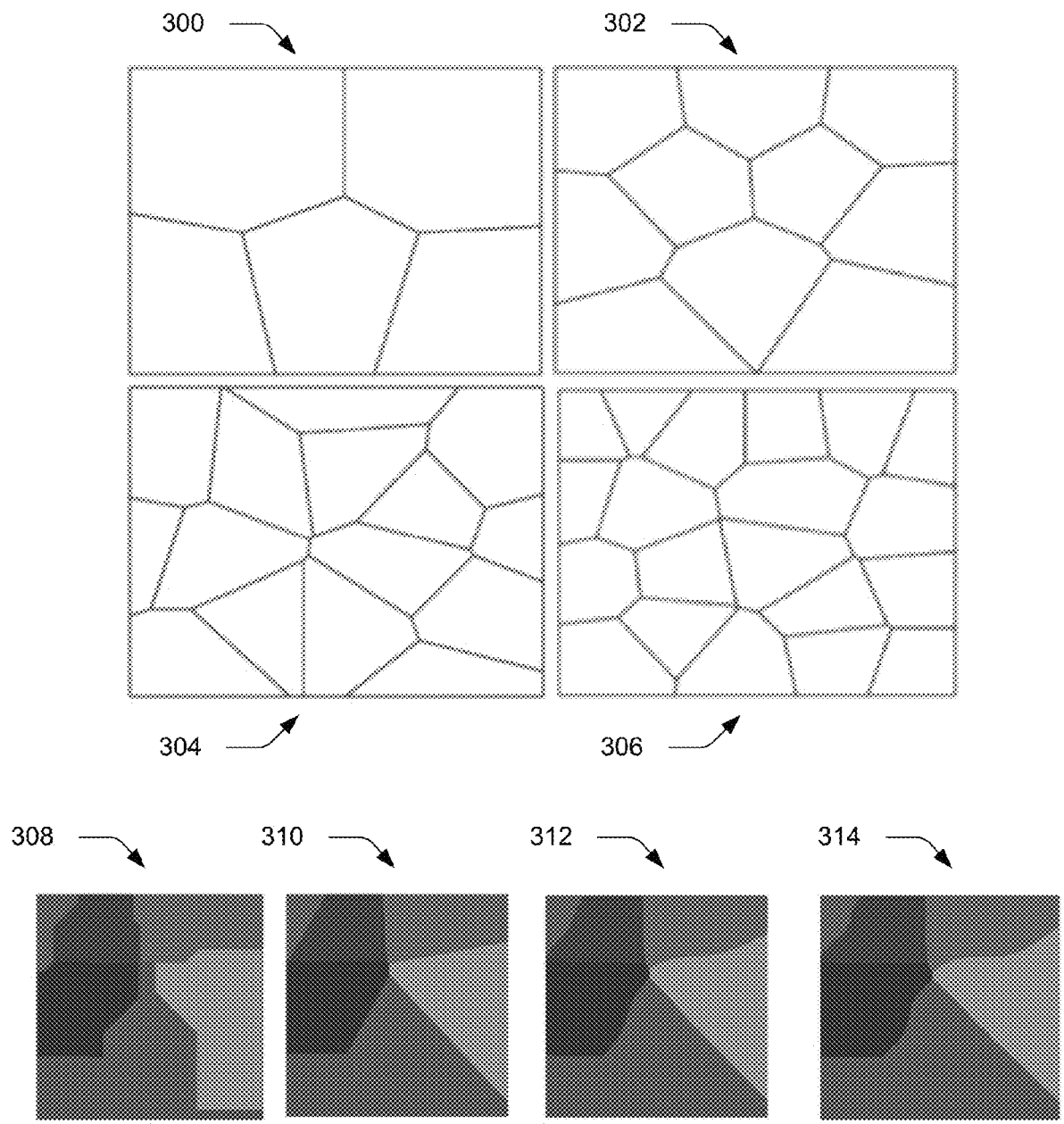
FIG. 3 depicts example collage templates in an example implementation of automatic content-aware collage techniques.

FIG. 3 depicts examples of templates 208 that have been generated by the template generation system 114. Example templates 300, 302, 304, and 306 each depict a template that has been generated according to a norm distance 206 of L2, and a number of regions 204 of five, ten, fifteen, and twenty, respectively. Example templates 308, 310, 312, and 314 each depict a template that has been generated according to a number of regions 204 of seven and with the same set of initial points P, but with a norm distance 206 of L1, L2, L3, and L4, respectively. The example templates 308, 310, 312, and 314 are depicted as colored regions corresponding to the respective points p in the set of initial points P. For instance, the upper-right region of each of the example templates 308, 310, 312, and 314 is depicted as green, and each green region corresponds to the same initial point $p_1$. However, as the definition of distance is altered according to the norm distance 206, the boundaries of the green region change among the example templates 308, 310, 312, and 314.

Figure 4:
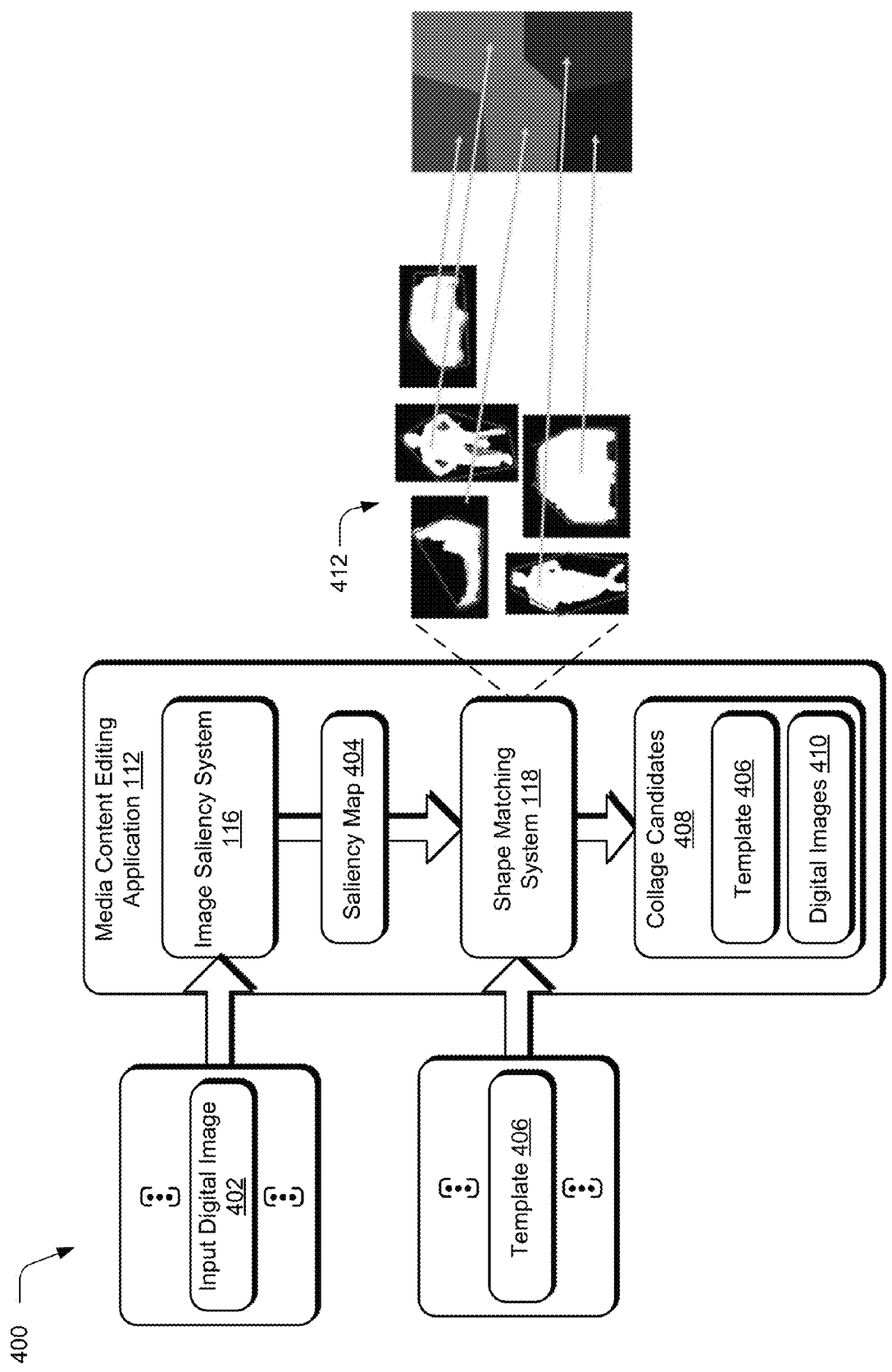
FIG. 4 depicts a system in an example implementation showing operation of an example image saliency system to generate saliency maps and an example shape matching system to generate collage candidates.

FIG. 4 depicts a system 400 showing an example image saliency and shape matching processing pipeline of the image saliency system 116 and shape matching system 118 of FIG. 1 in greater detail. The image saliency pipeline begins by the image saliency system 116 receiving an input digital image 402. The image saliency system 116 processes the input digital image 402 to generate a saliency map 404 corresponding to the input digital image 402.

To generate an informative collage, the automatic content-aware collage techniques described herein determine regions of interest within input digital images. To do so, the image saliency system 116 may generate the saliency maps 404 as simulating the human visual system to perceive the scene and indicate a relevance of each pixel in the composition of the digital image. This may include, for instance, determining what portions of a digital image have a distinctness that causes the portions to stand out from neighboring portions and grab the attention of a viewer. To achieve this, the image saliency system 116 may employ pattern distinctness detection, color distinctness detection, incorporate priors on human preferences and image organization, and so forth. Various techniques may be utilized to generate the image saliency maps 404, for example the DeepLabV3++ algorithm with MobileNet V2 to represent a fast network structure designed for mobile devices. In implementations, the saliency map 404 represents the sum of non-background layers in the input digital image 402.

The image saliency system 116 may employ facial detection techniques to further augment or adjust the saliency map 404 (e.g., to set facial regions at a highest saliency value), based on an insight that faces in digital images are often the most relevant information in a digital image to be included in a collage, and further to prevent cropping of faces during shape matching by the shape matching system 118 as described below. Various techniques may be utilized to perform facial recognition, such as the DLIB face detector. The image saliency system 116 may further prompt a user for input to indicate or select relevant regions within digital images to further augment or adjust the saliency map 404. Example inputs and outputs of the image saliency system 116 are shown in FIG. 5.

Figure 5:
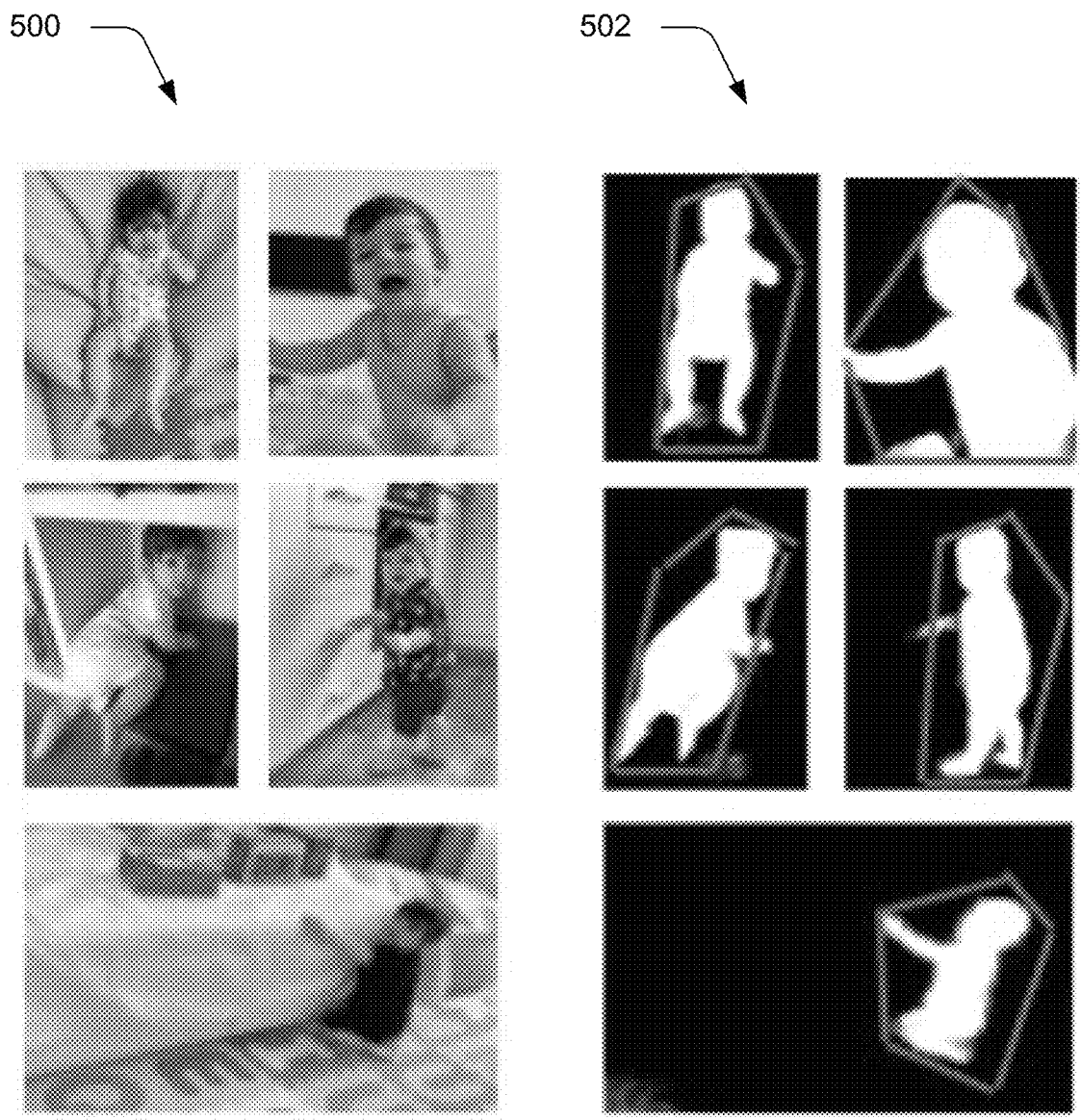
FIG. 5 depicts example input digital images and output saliency maps in an example implementation of automatic content-aware collage techniques.

FIG. 5 depicts input digital images 500 (e.g., corresponding to the input digital images 402 of FIG. 4) and output saliency maps 502 (e.g., corresponding to the saliency maps 404 of FIG. 4). As illustrated, salient portions of each respective digital image 500 are represented as white regions in the respective saliency maps 502, while non-salient portions are represented as black regions. The shape matching system 118 may further determine a region (e.g., a convex hull) associated with the salient portions of the saliency maps 502 as described in greater detail below. In this example, boundaries of convex hulls encompassing the salient regions are depicted as blue lines within the respective saliency maps 502. Further, although the example saliency maps 502 are depicted in a binary fashion (e.g., with pixels as either salient or not-salient), the saliency maps 502 may include various degrees of saliency for each pixel (e.g., numerical values representing magnitude of saliency).

Returning to FIG. 4, the saliency maps 404 are input to the shape matching system 118 along with a template 406 (e.g., corresponding to one or more of the templates 208 of FIG. 2). The shape matching system 118 generates at least one collage candidate 408 that includes a plurality of digital images 410 assigned to respective cells within the template 406. To do so, the shape matching system 118 generates matching pairs between cells of the template 406 and the salient regions of the saliency maps 404, while maximizing content displayed in the collage candidates 408. This may be visualized, for instance, as the example shape matching 412 in which five salient regions corresponding to five input digital images are matched with five cells in a template.

Figure 6:
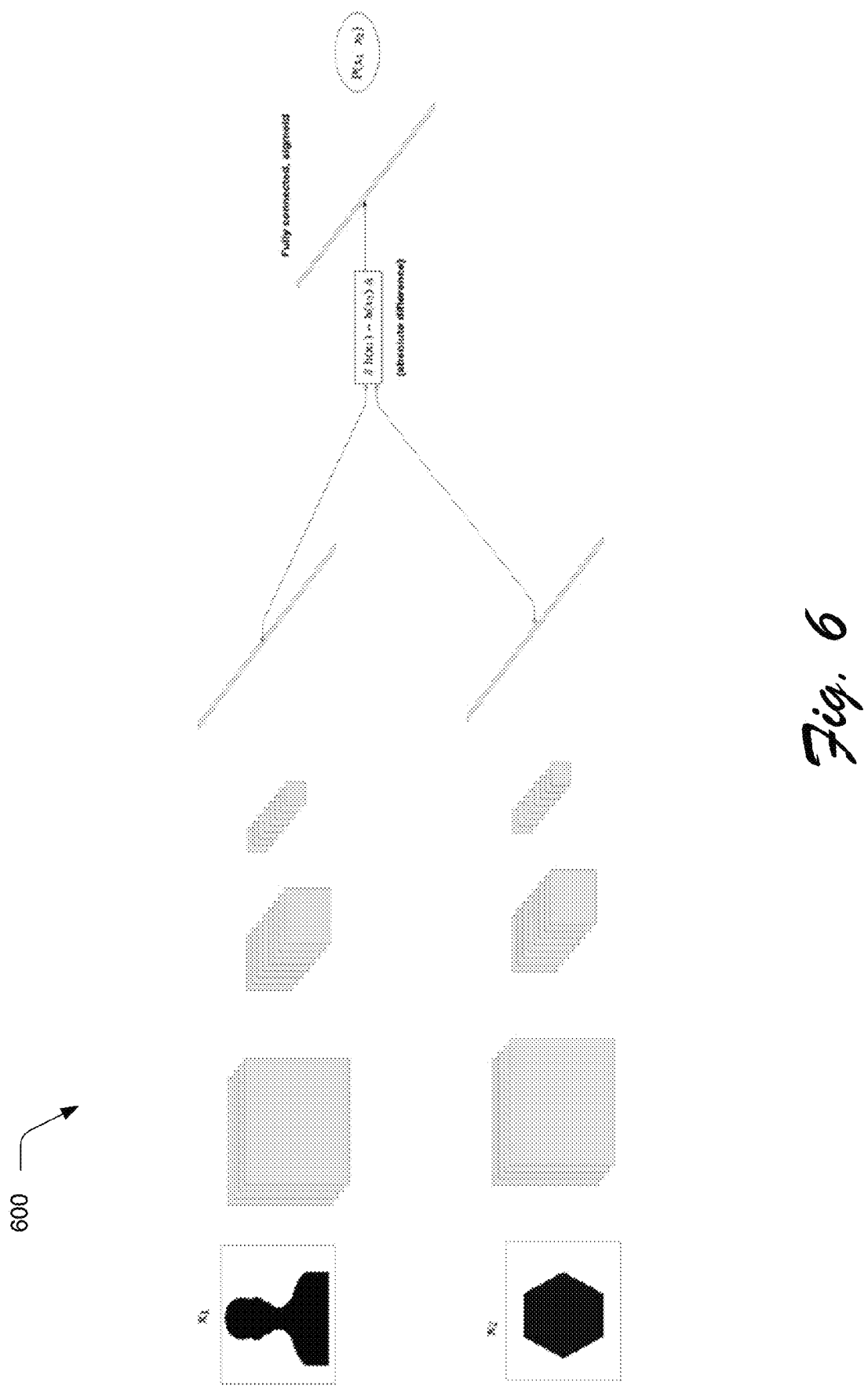
FIG. 6 depicts an example deep learning network architecture in an example implementation of automatic content-aware collage techniques.

The template 406 may be represented as $T=\{T_1, \ldots, T_N\}$, where $T_i$ represents a cell of the template T. The saliency maps 404 may be represented as $S=\{S_1, \ldots, S_N\}$, where $S_i$ is the extracted saliency region of a digital image i. The cells $T_i$ are each a convex shape, while the saliency regions $S_i$ may be convex or concave shapes. The shape matching system 118 transforms the saliency regions $S_i$ into convex shapes, such as through a convex hull algorithm. For example, the shape matching system 118 may utilize the Kirkpatrick-Seidel algorithm to convert concave saliency regions into convex shapes. For each convex shape $T_i$ and $S_i$ the shape matching system extracts a set of moment features $\eta(T_i)$ and $\eta(S_i)$, respectively, that represent features of each region of respective shapes. In order to determine the degree of similarity between shapes a Siamese deep learning network may be used. An example Siamese deep learning network architecture is illustrated as network 600 of FIG. 6. The shape matching system 118 utilizes a novel adapted feature extraction technique as opposed to conventional advanced shape features which merely match shapes. With the novel adapted feature extraction technique, the shape matching system 118 can not only match shapes but can also evaluate compositional matching and can provide invariance on scale and translation but not on rotation.

The novel adapted feature extraction technique solves for a permutation t of [n] such that an objective function $\Sigma_{i=1}^{N} d(\eta T_i, \eta S_{\pi(i)})$ is minimized, where d( ) denotes a norm distance (e.g., a Euclidean distance). To find a globally minimal solution, the shape matching system 118 constructs a bipartite graph. On a first side of the bipartite graph, a vertex is created for each target template location. On a second side of the bipartite graph, a vertex is created for each salient shape. Accordingly, the bipartite graph has a total of N vertices on each side. A complete bipartite graph is generated such that an edge $e(V_{T_i}, V_{S_{\pi(i)}})$ between a template vertex and a salient vertex is given a weight $d(\eta T_i, \eta S_{\pi(i)})$. The shape matching system 118 minimizes the objective function by finding a minimal bipartite matching on the complete bipartite graph.

Figure 7:
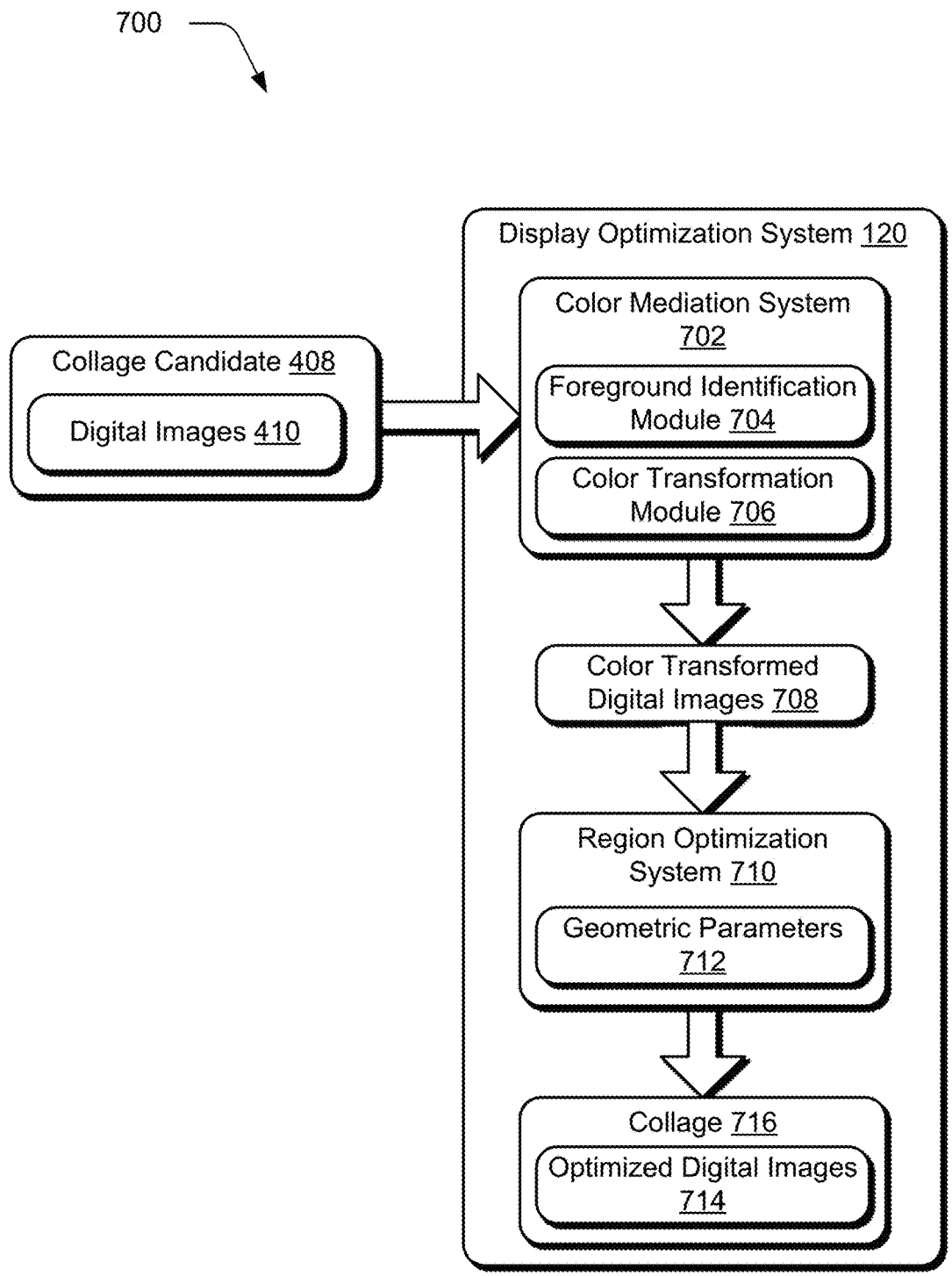
FIG. 7 depicts a system in an example implementation showing operation of a color mediation system to generate color transformed digital images and an example region optimization system to generate geometric parameters.

FIG. 7 depicts a system 700 showing an example color mediation and region optimization processing pipeline of the display optimization system 120 of FIG. 1 in greater detail. The display optimization processing pipeline begins by a color mediation system 702 receiving a collage candidate 408 (e.g., the collage candidate 408 of FIG. 4). The color mediation system 702 may adjust the chrominance of the digital images 410 in the collage candidate 408 in order to adjust the visual coherence of the collage candidate 408. For instance, if different ones of the digital images 410 have major differences in colors or luminance, the digital images may be jarring when placed adjacent to each other in the collage candidate 408. The color mediation system 702 mediates the color palette and luminance of the digital images 410 with a reduction in color artifacts as compared to a conventional global filter.

The color mediation system 702 employs a foreground identification module 704 to split color information into foreground and background regions for a digital image 410. For instance, foreground regions typically have largely different chrominance values compared to a background region, and humans are often more sensitive to changes in foreground chrominance (e.g., changes to facial appearance in a digital image). Accordingly, the color mediation system 702 determines foreground and background regions, and separately applies a color transformation module 706 to each respective foreground and background region in order to generate color transformed digital images 708.

The color transformation module 706 may, for the respective foreground and background regions, clip the minimum one percent pixels of luminance levels and the maximum one percent pixels of luminance levels and stretch a luminance to cover the full dynamic range. The color transformation module 706 may then perform a fast-global color statistic transformation technique on a respective region, achieving greater speeds than conventional complex color transformation based on object matching. Given a source digital image and a target digital image, the color transformation module 706 finds a continuous mapping $u \to t(u)$, such that the new color distribution $t(u)$ for a source digital image with a color distribution u will match the target image color distribution. The chrominance distribution of the digital images 410 may be extracted in a multivariate Gaussian $N_C(\mu_C, \Sigma_C)$, and this multivariate Gaussian is considered as the target image. Accordingly, the color transformation module 706 may determine a collection of functions Ti( ) that map the Gaussian statistics of digital image i, $N_i(\mu_i, \Sigma_i)$, to the Gaussian statistics of the target image. This may be performed, for example, using a Linear Monge-Kantorovitch mass transportation approach according to the following:

$$t_i(u) = T_i(u - \mu_{I_i}) + \mu_C$$

where $T_i \Sigma_{I_i} T_i^T = \Sigma_C$ and T is the unique solution of the equation:

$$T = \sum_I^{-\frac{1}{2}} \left( \sum_I^{\frac{1}{2}} \sum_C \sum_I^{\frac{1}{2}} \right)^{\frac{1}{2}} \sum_I^{-\frac{1}{2}}$$

where T is a linear transformation, u is a chrominance of a pixel x from a source digital image and t(u) is a new chrominance value that will replace pixel x in the output digital image. In this example, $I_i$ is an image i from among input images for a collage, C is an intermediary collage image which includes all input images, $\mu_{I_i}$ is the mean of image $I_i$, $\Sigma_{I_i}$ is a covariance matrix of the image $I_i$, $\mu_C$ is the mean of image C, $\Sigma_C$ is a covariance matrix of image C, $T_i$ is a function that maps the Gaussian statistics of image $I_i$, $(\mu_{I_i}, \Sigma_{I_i})$ to the Gaussian statistics of image C, $(\mu_C, \Sigma_C)$, and $T_i^T$ is a transpose of matrix $T_i$.

In implementations, the diagonal elements of $\Sigma_I$ are clipped to $\lambda=0.01$, in order to increase stability when a digital image has a low color variation. By utilizing the color transformation module 706 to perform the color mediation techniques independently for foreground and background regions, foreground objects are not blended with the colors of background objects and vice versa, increasing the quality of the results beyond that of conventional techniques utilizing global filters. Example results of a conventional global filter technique and the color mediation techniques described herein are illustrated with respect to FIG. 8.

Figure 8:
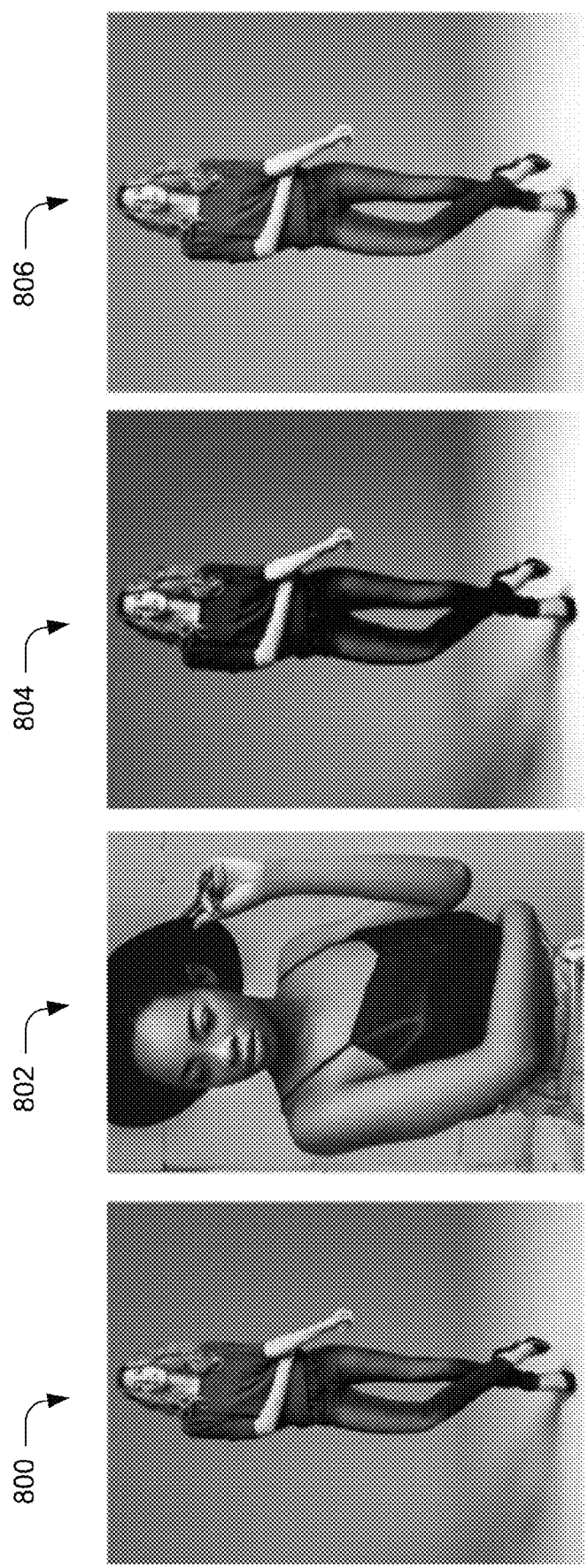
FIG. 8 depicts example digital images for input and output of color adjustments techniques.

FIG. 8 depicts a source digital image 800 and a target digital image 802. Color adjustment techniques are applied on the source digital image 800 to make the source digital image 800 appear more similar to the target digital image 802. A result of a conventional global filter technique is illustrated as the example result 804, in which the entirety of the source digital image 800 is adjusted based on the entirety of the target digital image 802. As depicted, the example result 804 has dramatically altered the hair color, skin tone, clothing colors, and background colors as compared to the source digital image 800, as neither the foreground features nor the background features of the source digital image 800 match a chrominance of the combination of both foreground and background features of the target digital image 802. A result of the color mediation techniques described herein is illustrated as the example result 806. As depicted, the example result 806 has altered the background color of the source digital image 800 to match the background color of the target digital image 802, and has only slightly altered foreground features (e.g., hair color, skin tone, clothing colors) of the source digital image 800 to match foreground features of the target digital image 802.

Returning to FIG. 7, the color transformed digital images 708 are input to a region optimization system 710. The region optimization system 710 adjusts geometric parameters 712 that are associated with each of the color transformed digital images 708, including geometric parameters such as translation and scale. The color transformed digital images 708 are associated with particular cells of the collage candidate 408 (e.g., corresponding to the particular cells of the template 406 of FIG. 4 to which the digital images 410 are associated). Each respective one of the color transformed digital images 708 has its scale and translations determined independently from other digital images. To maximize the saliency region of a color transformed digital image 708 to be included in the corresponding cell, a scale factor s is determined according to:

$$s = \max\left(\frac{width_{T_i}}{width_I}, \frac{height_{T_i}}{height_I}\right)$$

where (width$_{T_i}$, height$_{T_i}$) is the size of the bounding rectangle of the cell i, and (width$_I$, height$_I$) is the size of the color transformed digital image 708. The scale factor s allows for uniform scaling of the color transformed digital image 708 without distortions.

Figure 9:
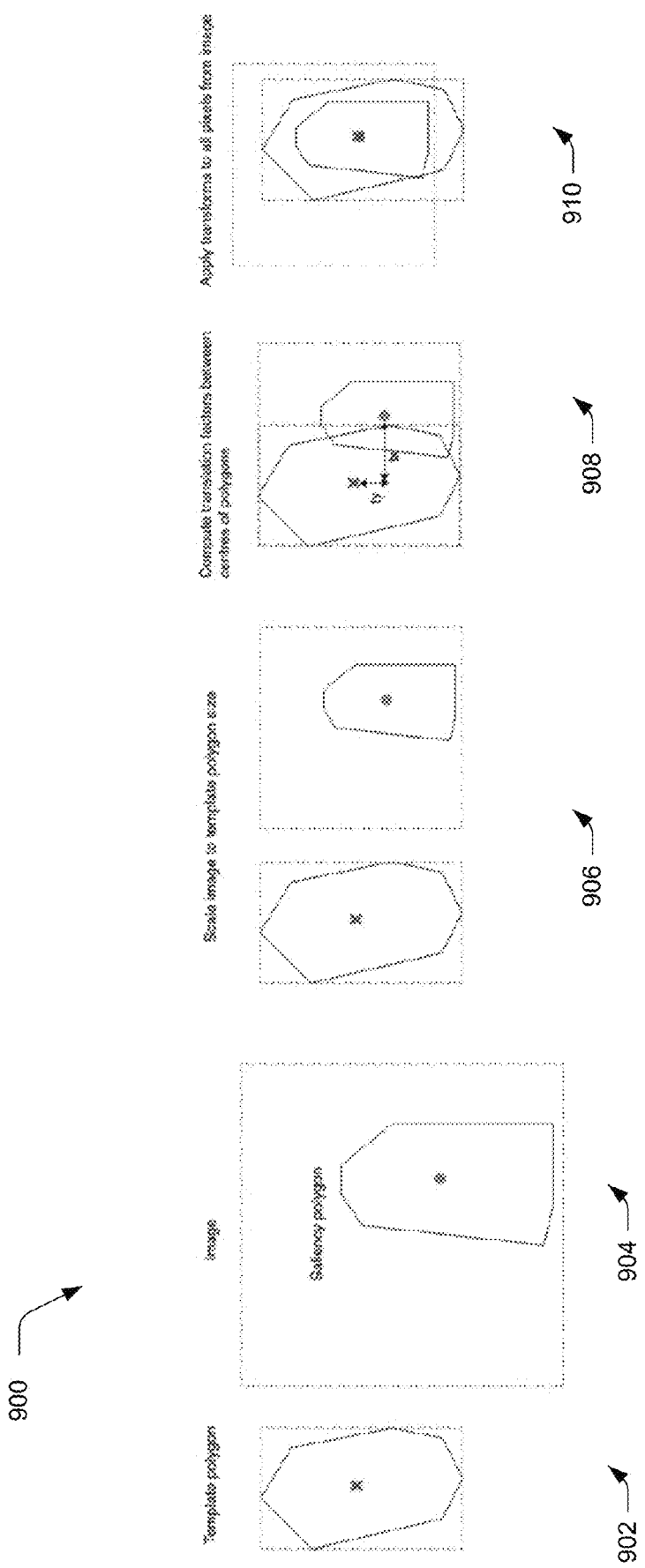
FIG. 9 depicts an example visualization of a region optimization system determining geometric parameters and applying the geometric parameters to an input digital image.

The region optimization system 710 locates or 'centers' the color transformed digital image 708 inside of the cell using translation factors tx and ty, determined as a difference between the cell polygon center and the center of the salient region of the color transformed digital image 708. In implementations, the center of the salient region is weighted to give greater weights to face regions or to regions selected by a user as being salient regions. The geometric parameters 712 are then applied to all pixels of the color transformed digital image 708 to create optimized images 714, and a collage 716 is created that incorporates the optimized digital images 714. An example visualization of the region optimization system 710 as applied to a color transformed digital image 708 is illustrated in FIG. 9 and described below.

In implementations, the media content editing application 112 generates a plurality of different collages. For each respective generated collage, the media content editing application 112 may generate a score to measure how much relevant content is presented in a particular collage. For instance, the scores may be utilized to rank generated collages. The ranking of collages may be used to select a particular collage, select top n collages for display to a user for selection, and so forth. The media content editing application may utilize the following equation to generate the scores:

$$C_k = \frac{\sum_{i=1}^{N} S_i}{H_k}$$

where S$_i$ represents the saliency score for an image i, and H$_k$ is a matching score obtained from the bipartite graph matching.

FIG. 9 depicts an example visualization 900 of the region optimization system 710 determining the geometric parameters 712 and applying the geometric parameters 712 to an input digital image. A template polygon 902 represents the boundaries of a cell of a collage template, and the cell's polygon center is depicted as a red 'X' in the center of the template polygon 902. A digital image 904 represents a color transformed digital image 708 as depicted with a dotted green rectangle. Boundaries of a salient region polygon of the digital image 904 is depicted with black lines, while a center of the saliency polygon is depicted with a green dot. A scaling factor for the digital image 904 is determined according to a size of the template polygon 902 and depicted according to relative scaled sizes at 906. Translation factors between the center of the template polygon 902 and the saliency polygon of the digital image 904 are determined and depicted at 908 as vectors tx and ty. The scaling factor and the translation factors are applied at 910 to all pixels of the digital image 904, resulting in an overlap between the digital image 904 and the template polygon 902. As illustrated, the entirety of the saliency polygon of the digital image 904 may be located within the template polygon 902 with aligned centers. Portions of the digital image 904 that are not within the template polygon 902 may be cropped or otherwise removed from visibility (e.g., through use of clipping masks, and so forth).

Figure 10:
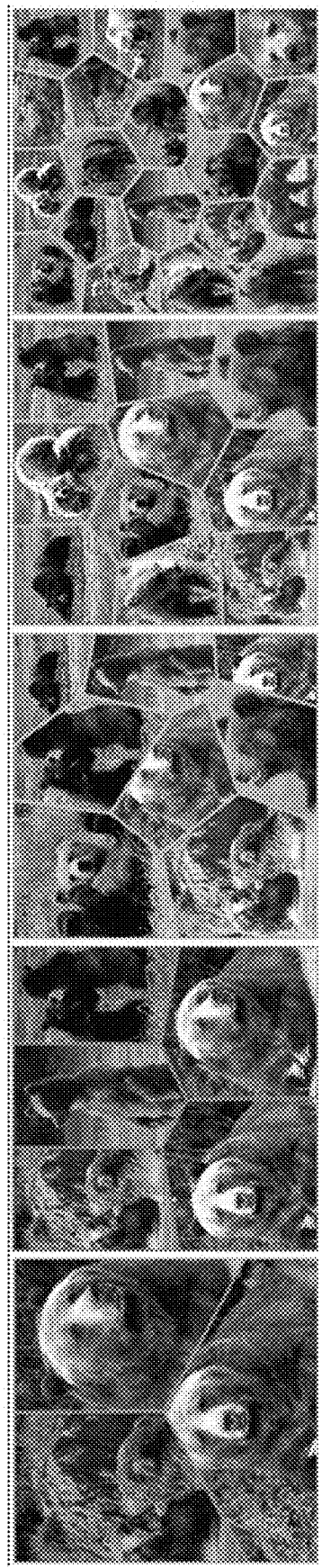
FIG. 10 depicts example collages generated through use of the automatic content-aware collage techniques described herein.
Figure 10:
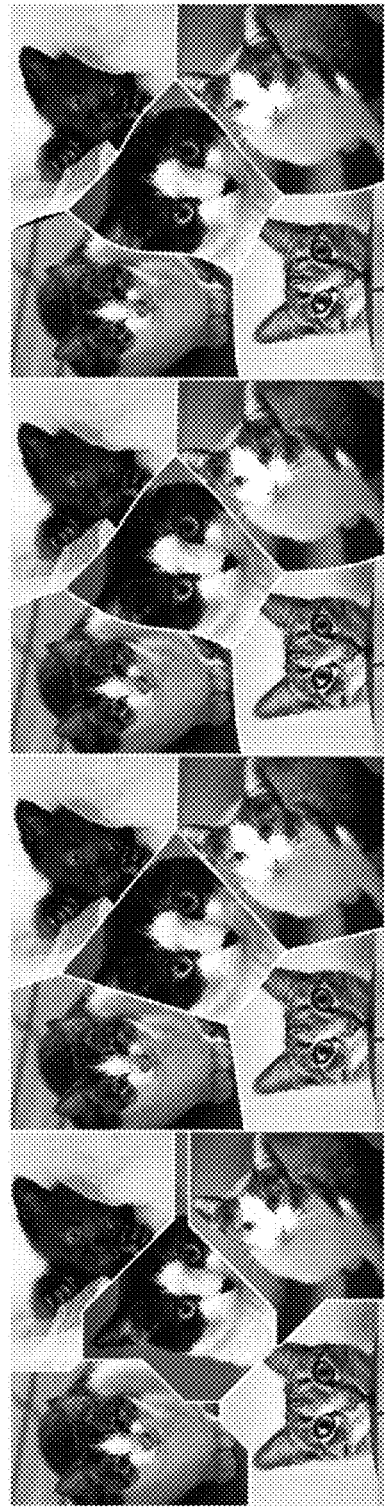

FIG. 10 depicts example collages 1000 and 1002 (e.g., corresponding to the collage 716 of FIG. 7), for instance as displayed within a graphical user interface of the computing device 102 or otherwise output from the media content editing application 112. In this example, a user of the media content editing application 112 has generated a creation input 202 of FIG. 2 and provided input digital images 402 to the media content editing application 112, and the media content editing application 112 has generated collages 716. The example collages 1000 include five different collages pertaining to images of bears, with collages including one, five, eight, ten, and twenty images, respectively. The example collages 1002 include four different collages pertaining to images of cats. Each of the example collages 1002 includes the same five digital images and was generated with the same initial points, but with different norm distances.

Figure 11:
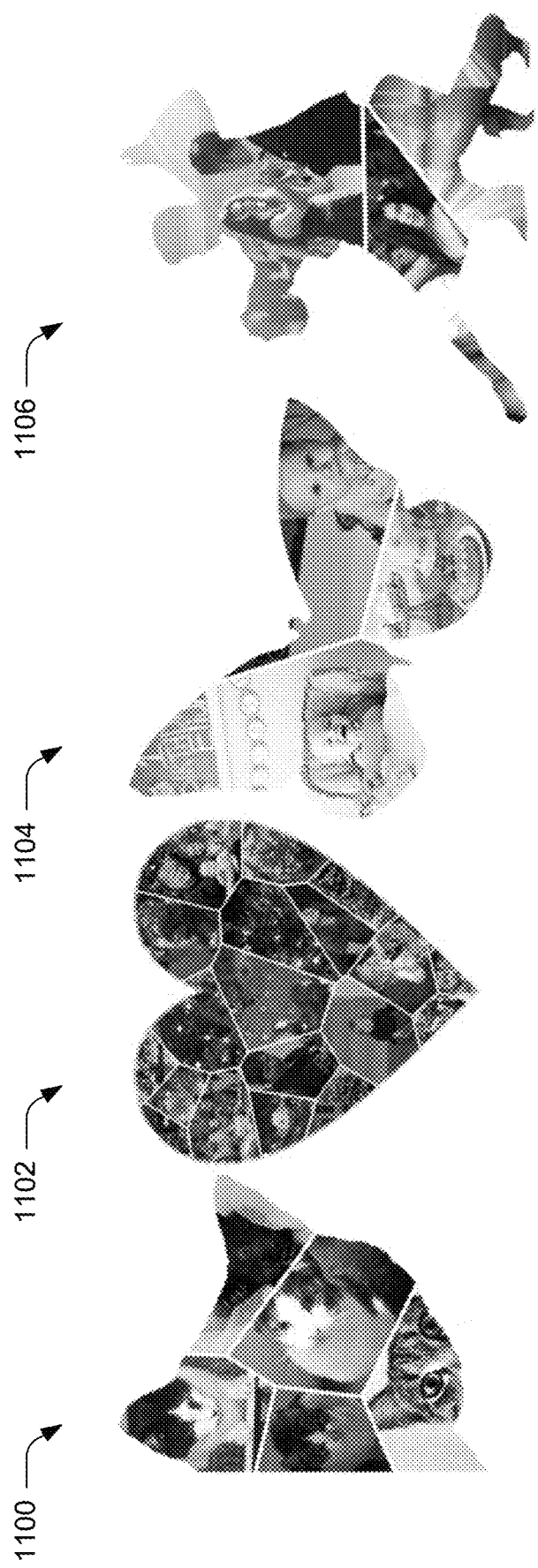
FIG. 11 depicts example collages generated through use of the automatic content-aware collage techniques described herein on canvases with complex shapes.

It is to be appreciated that the automatic content-aware collage techniques may be applied to a canvas of any shape. Although the examples described herein generally pertain to a rectangular canvas, any canvas may be used. For example, FIG. 11 depicts example collages 1100, 1102, 1104, and 1106, each of which was generated by the media content editing application 112 with a canvas that is not rectangular. Example collage 1100 was generated on a canvas with a shape of a cat's head. Example collage 1102 was generated on a canvas with a shape of a heart. Example collage 1104 was generated on a canvas with a shape of a butterfly. Example collage 1106 was generated on a canvas with a shape of a dancing couple. While conventional techniques require pre-established templates with predetermined shape, the automatic content-aware collage techniques described herein adaptively generate templates at run-time, and may thus generate templates for any shape of canvas, thus providing increased flexibility and functionality as compared to conventional techniques for collages. For example, a user of the automatic content-aware collage techniques may provide a digital image or shape to define a canvas shape, select a canvas shape from a list of preconfigured options, and so forth.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

Figure 12:
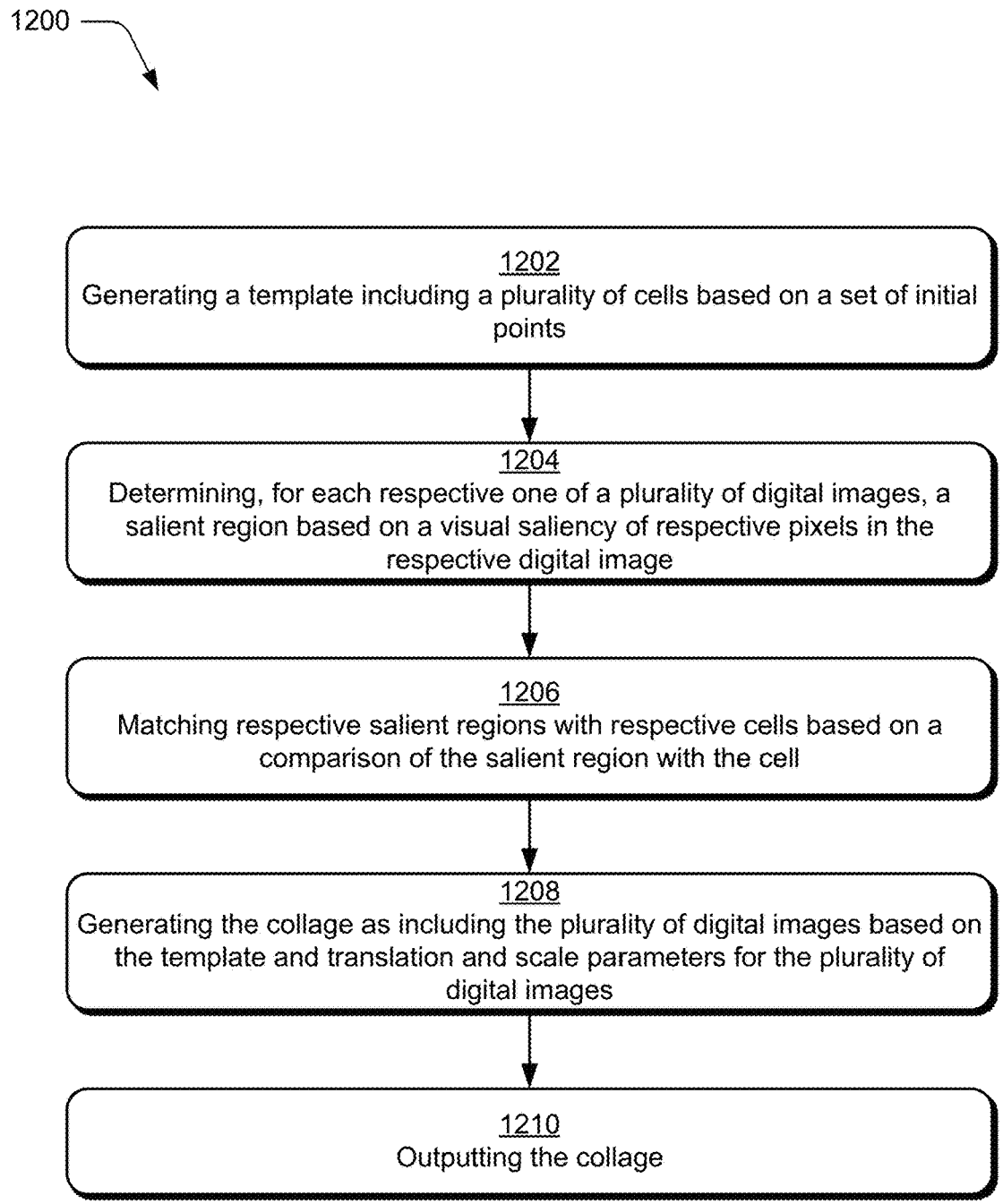
FIG. 12 is a flow diagram depicting a procedure in an example implementation of automatic content-aware collage techniques.

FIG. 12 depicts a procedure 1200 in an example implementation in which a collage is generated using automatic content-aware collage techniques. A user input is received to initiate creation of a collage (block 1202). The user input may include, for example, at least one of an indication of a number of regions, a norm distance for use in generating a template, digital images to be included in the collage, and a canvas shape. The norm distance, for instance, affects the definition of a length of a vector. The user input may be, for example, the creation input 202 of FIG. 2.

A template is generated including a plurality of cells based on a set of initial points (block 1202). A user input, for instance, is received to initiate creation of a collage, and may include at least one of an indication of a number of regions, a norm distance for use in generating a template, digital images to be included in the collage, a canvas shape, and so forth. A set of initial points, such as a number of initial points corresponding to a number of regions indicated by the user input, are utilized to divide a canvas into a plurality of cells. In implementations, each cell of the plurality of cells is a complex shape that is a non-regular polygon. For instance, the canvas may be partitioned according to a Voronoi diagram corresponding to the set of initial points, with each respective cell including points that are closer to a corresponding initial point than any other initial point. The Voronoi diagram may be generated according to a norm distance indicated by the user input, and the set of initial points may be a random set of points initialized in a centered manner to avoid very asymmetrical diagrams with large variations in cell sizes. In implementations, a plurality of different templates are generated that each include a respective plurality of cells. For instance, each of the plurality of different templates may be generated according to a different norm distance, a different set of initial points, and so forth. This may be performed, for example, by the template generation system 114 of FIG. 1.

A salient region is determined, for each respective one of a plurality of digital images, based on a visual saliency of respective pixels in the respective digital image (block 1204). This may include determining portions of a digital image that have a distinctness that causes the portions to stand out from neighboring portions and grab the attention of a viewer. For example, pattern distinctness detection, color distinctness detection, facial detection, and so forth may be utilized in determining portions of a region that are salient, and salient regions of a digital image may be determined on a pixel by pixel basis. The saliency map, for instance, may indicate a plurality of salient pixels that collectively form a concave region. A concave region corresponding to the salient pixels may be determined according to a convex hull algorithm, for example the Kirkpatrick-Seidel algorithm. The salient region may thus include both salient and non-salient pixels of the saliency map. This may be performed, for instance, by the image saliency system 116 and the shape matching system 118 of FIG. 1.

Respective salient regions are matched with respective cells based on a comparison of the salient region with the cell (block 1206). For example, shapes are matched while evaluating compositional matching and providing invariance on scale and translation but not on rotation. For each respective convex shape in the template and the salient regions, a set of moment features may be extracted that represent features of each region of the respective shapes. These moment features may be compared, such as with a Siamese deep learning network, to match salient regions with cells of the template. This may be performed, for instance, by the shape matching system 118 of FIG. 1. By comparing moment features, similar convex shapes may be identified without respect for scale or translation, while maintaining rotation. In this way, a match is determined for each salient region without regard for non-salient portions of the digital images. As the match may be determined with invariance for scale and translation, the digital images may be subsequently transformed with respect to scale and translation to maximize salient portions of the digital image with respect to the template.

The collage is generated as including the plurality of digital images based on the template and translation and scale parameters for the plurality of digital images (block 1208). For instance, the digital images are transformed according to translation and scale parameters, and the transformed digital images are placed within respective cells of the template, and the plurality of digital images within the template collectively form a collage as a single digital image. Respective translation and scale parameters may be determined for each respective digital image, such as based on a portion of the digital image such as the salient region of a respective digital image, and may be applied to the digital image as a whole (e.g., applied to every pixel of the digital image). The translation parameters, for instance, are used to reposition a salient region of a digital image to be generally centered with respect to a cell of a template, and scale parameters may be used to resize the digital image such that the salient region of the digital image occupies a large portion of the cell of the template. In implementations, a plurality of different collages are generated. The collages may be automatically ranked, such as according to how much relevant content is presented in a respective collage. Further, the collages may be displayed to a user, and the user may select a particular collage. This may be performed, for instance, by the media content editing application 112 of FIG. 1.

The collage is output (block 1210). This may include displaying the collage on a display device of a computing device, storing the collage in a memory device of a computing device, communicating the collage to another computing device via a network, transmitting the collage to a printing device for creation of a physical representation of the collage, and so forth.

Example System and Device

Figure 13:
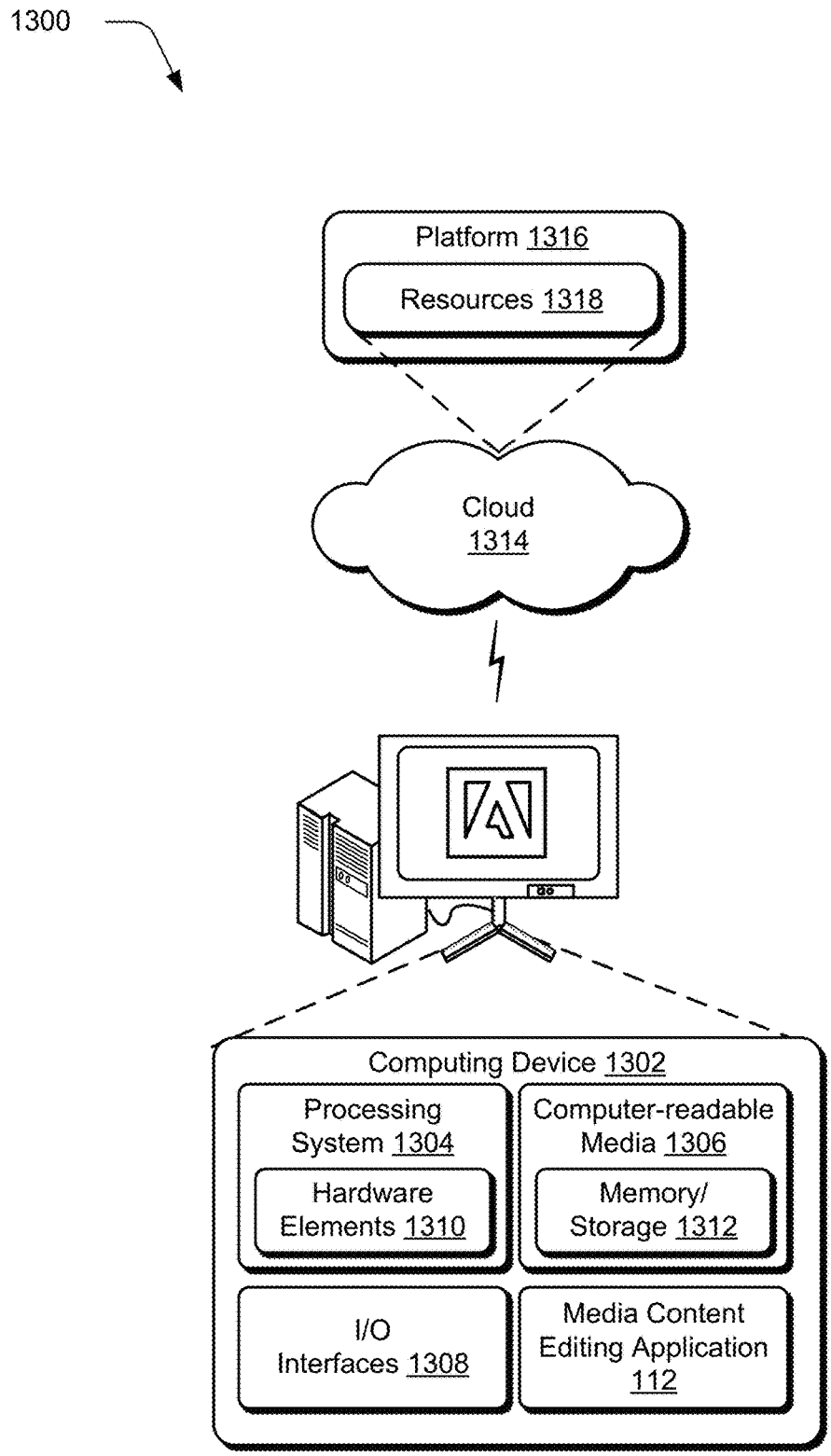
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the media content editing application 112. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage component 1312. The memory/storage component 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   generating, by a processing device and responsive to receiving a user input, a template including a plurality of cells based on a set of initial points;
   determining, by the processing device and for each respective one of a plurality of digital images, a salient region based on a visual saliency of respective pixels in the respective digital image;
   generating, by the processing device, a saliency map indicating a center of the salient region for each respective one of the plurality of digital images;
   assigning, by the processing device, a weight to the center of the salient region for each respective one of the plurality of digital images;
   matching, by the processing device, respective salient regions with respective cells based on a comparison of a shape of the salient region with a shape of the cell using deep learning to maximize salient content in visible regions of matched results by centering the center of the salient region in the cell based on the weight;
   generating, by the processing device, a collage as including the plurality of digital images based on the template and the matching; and
   outputting, by the processing device, the collage.

2. The method of claim 1, wherein the set of initial points is randomly generated.

3. The method of claim 1, wherein the user input includes at least one of a number of regions and a norm distance.

4. The method of claim 3, wherein the norm distance defines a function space usable to define lengths of vectors.

5. The method of claim 1, wherein the generating the template includes generating a plurality of templates that each include a respective plurality of cells.

6. The method of claim 5, wherein each of the plurality of templates is generated using a different respective norm distance.

7. The method of claim 5, wherein each of the plurality of templates is generated using a different set of initial points.

8. The method of claim 1, wherein the template includes a Voronoi diagram.

9. The method of claim 1, wherein each respective salient region is a convex hull.

10. The method of claim 1, further comprising determining translation and scale parameters for a respective one of the digital images based on a salient region of the respective one of the digital images, and wherein the generating the collage is further based on the translation and scale parameters as applied to the respective one of the digital images.

11. The method of claim 1, further comprising:
    mediating a foreground chrominance, for each respective one of the plurality of digital images, based on foreground regions of the respective digital image and foreground regions of a target digital image; and
    mediating a background chrominance, for each respective one of the plurality of digital images, based on background regions of the respective digital image and background regions of the target digital image.

12. The method of claim 1, further comprising:
    generating a plurality of collages as each including the plurality of digital images based on a respective template and respective matchings;
    displaying the plurality of collages on a display device of the processing device;
    receiving another user input to select one of the plurality of collages; and
    wherein the outputting the collage includes outputting the selected one of the plurality of collages.

13. The method of claim 1, further comprising detecting a face in the salient region and assigning a greater weight to the face than the center of the salient region.

14. A system comprising:
    a template generation system configured to generate a template including a plurality of cells based on a set of initial points and responsive to receiving a user input to initiate creation of a collage, each cell of the plurality of cells being a complex shape;
    an image saliency system configured to determine, for each respective one of a plurality of digital images, a salient region based on a visual saliency of respective pixels in the respective digital image and to generate a saliency map indicating a center of the salient region for each respective one of the plurality of digital images;
    a weighting system configured to assign a weight to the center of the salient region for each respective one of the plurality of digital images;
    a shape matching system configured to match respective salient regions having complex shapes as non-regular polygons with respective cells having complex shapes as non-regular polygons based on a comparison of the salient region with the cell to maximize salient content in visible regions of matched results by centering the center of the salient region in the cell based on the weight;
    a media content editing application configured to generate the collage as including the plurality of digital images based on the template and the matched regions.

15. The system of claim 14, wherein the user input includes at least one of a number of regions and a norm distance that defines a function space usable to define lengths of vectors.

16. The system of claim 14, wherein the generating the template includes generating a plurality of templates that each include a respective plurality of cells.

17. The system of claim 16, wherein each of the plurality of templates is generated using a different respective norm distance.

18. A system comprising:

means for generating, responsive to receiving a user input to initiate creation of a collage, a template including a plurality of cells based on a set of initial points;

means for determining, for each respective one of a plurality of digital images, a salient region based on a visual saliency of respective pixels in the respective digital image;

means for generating a saliency map indicating a center of the salient region for each respective one of the plurality of digital images;

means for assigning a weight to the center of the salient region for each respective one of the plurality of digital images;

means for matching respective salient regions with respective cells based on a comparison of moment features as a quantitative measure of a shape of a function of pixel intensities of the salient region with moment features as a quantitative measure of a shape of a function of pixel intensities of the cell to maximize salient content in visible regions of matched results by centering the center of the salient region in the cell based on the weight;

means for generating the collage as including the plurality of digital images based on the template and the matching.

19. The system of claim 18, wherein the user input includes a norm distance that defines a function space usable to define lengths of vectors.

20. The system of claim 18, wherein the means for generating the template includes means for generating a plurality of templates that each include a respective plurality of cells using a different respective norm distance.

* * * * *